United States Patent
Liu et al.

(10) Patent No.: US 8,451,762 B2
(45) Date of Patent: May 28, 2013

(54) METHOD AND APPARATUS FOR RELIABLY DELIVERING MULTICAST DATA

(75) Inventors: Hang Liu, Yardley, PA (US); Kumar Ramaswamy, Princeton, NJ (US); Jill MacDonald Boyce, Manalapan, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 798 days.

(21) Appl. No.: 12/227,550

(22) PCT Filed: Jun. 27, 2006

(86) PCT No.: PCT/US2006/024973
§ 371 (c)(1),
(2), (4) Date: Nov. 20, 2008

(87) PCT Pub. No.: WO2008/002294
PCT Pub. Date: Jan. 3, 2008

(65) Prior Publication Data
US 2009/0147718 A1      Jun. 11, 2009

(51) Int. Cl.
*H04H 20/71*      (2008.01)
(52) U.S. Cl.
USPC .......................................... 370/312; 370/390
(58) Field of Classification Search
None
See application file for complete search history.

(56) References Cited

U.S. PATENT DOCUMENTS

| | | | |
|---|---|---|---|
| 7,031,326 B1 | 4/2006 | Shur et al. | |
| 7,181,526 B1* | 2/2007 | Bell et al. | 370/390 |
| 7,443,851 B2 | 10/2008 | Fukushima et al. | |
| 7,533,164 B2 | 5/2009 | Volz et al. | |
| 2002/0116529 A1* | 8/2002 | Hayden | 709/245 |
| 2002/0143951 A1 | 10/2002 | Khan et al. | |
| 2002/0191567 A1 | 12/2002 | Famolari et al. | |
| 2003/0133458 A1 | 7/2003 | Sato et al. | |
| 2004/0090970 A1* | 5/2004 | Sanchez et al. | 370/397 |
| 2004/0264463 A1 | 12/2004 | Fukushima et al. | |
| 2005/0002395 A1 | 1/2005 | Kondo | |
| 2005/0100016 A1* | 5/2005 | Miller et al. | 370/390 |
| 2005/0108331 A1 | 5/2005 | Osterman | |
| 2005/0180440 A1 | 8/2005 | Perrot et al. | |

FOREIGN PATENT DOCUMENTS

| | | |
|---|---|---|
| CN | 1647489 | 7/2005 |
| CN | 1700678 | 11/2005 |
| EP | 1347614 | 9/2003 |
| JP | 10242962 | 9/1998 |
| JP | 2005176155 | 6/2005 |
| WO | WO0227989 | 4/2002 |
| WO | WO2005036818 | 4/2005 |

OTHER PUBLICATIONS

Gupta et al.:"Reliable Multicast MAC Protocol for Wireless LANs", IEEE 2003 International Conference on Communications (Cat. No. 03CH37441), Pt, vol. 1, pp. 93-97. May 11-15, 2003.
International Search Report, dated Mar. 13, 2007.

* cited by examiner

*Primary Examiner* — David Oveissi
(74) *Attorney, Agent, or Firm* — Robert D. Shedd; Jeffrey M. Navon; Catherine A. Cooper

(57) ABSTRACT

A method and apparatus are described including mapping a multicast connection to a unicast uniform resource identifier, establishing a state for a multicast-to-unicast conversion, allocating ports, receiving multicast addressed data packets and converting the multicast addressed data packets to unicast addressed data the packets.

13 Claims, 6 Drawing Sheets

METHOD AND APPARATUS FOR RELIABLY DELIVERING MULTICAST DATA

This application claims the benefit, under 35 U.S.C. §365 of International Application PCT/US2006/024973 filed Jun. 27, 2006, which was published in accordance with PCT Article 21(2) on Jan. 3, 2008, in English.

FIELD OF THE INVENTION

The present invention relates to the reliable delivery of multicast data. Specifically the present invention relates to the reliable delivery of multicast data to one or more receivers over wireless networks employing application layer multicast-to-unicast conversion.

BACKGROUND OF THE INVENTION

Multicasting data offers efficient utilization of network resources to deliver data to multiple users. For example, telecommunications service providers offer unified data, voice and video services to the customers over their Digital Subscriber Line (DSL) networks. A TV program is transmitted in IP multicast over the DSL network to the media gateways at the customer homes. The program data can then be redistributed to the set-top boxes, IP TV receivers or mobile devices (called receivers in this area of technology) over wireless local area networks (WLANs) in customers' homes. However, the transmission of multicast data packets is not as reliable as the transmission of unicast data packets in a WLAN. The techniques for reliable transmission, such as adaptation of modulation and channel coding schemes and retransmissions of lost packets are only used for unicast data traffic by the WLAN physical and data link layers. That is, the WLAN can much more reliably transmit data packets with unicast destination addresses than data packets with a multicast address.

Application layer error control techniques such as forward error correction (FEC) and resilience video coding can improve the reliability of multicast video transmission. However, these techniques introduce high overhead such that the bandwidth efficiency is reduced. Furthermore, for multicast transmissions, there may be multiple receivers and each receiver may incur different radio link qualities. It is difficult to satisfy the requirements of all the receivers.

Some video/audio streaming server software can convert a multicast stream to multiple unicast streams. However, the streaming server software runs on a computer and only binds one IP interface with the host IP address. The server software receives the multicast stream and sends out the unicast streams over the same interface. If the same video stream is sent from the streaming server to multiple homes or multiple receivers in a home in unicast, it would consume increased network resources such as bandwidth in the wired DSL network.

SUMMARY OF THE INVENTION

The present invention is described herein in terms of a wireless local area network (WLAN) but any wireless network could be the basis of the present invention.

The present invention, as described herein, is a method and apparatus for reliable delivery of multicast data to one or more receivers over wireless networks (for example, wireless local area networks) employing application layer multicast to unicast conversion. The method includes the following: 1) obtaining the session description of multicast programs from an external interface; 2) receiving the request from a receiver via a wireless network e.g., via a wireless local area network (WLAN) interface (internal interface) to subscribe to a multicast program; 3) acting as a proxy to request the program for the receiver via the external interface and maintaining the state information for the at least one requesting receiver including mapping of the multicast address of the program (program source) and the address of the receiver; 4) when receiving the multicast data packets of the requested program from the external interface, converting the multicast destination address in the packets to the unicast destination addresses of one or more receivers and forwarding the unicast packets to the receiver (at least one) over the wireless (WLAN) interface; 5) when a particular receiver tears down (dis-establishes) the session, ceasing to transmit the data packets to this particular receiver via the wireless (WLAN) interface. If this particular receiver is the last receiver to subscribe the requested program, also stop receiving the program via the external interface.

A method and apparatus for delivering multicast addressed data packets over a wireless network are described including mapping a multicast connection to a unicast uniform resource identifier, establishing a state (internal) for a multicast-to-unicast conversion, allocating ports, receiving multicast addressed data packets, converting the multicast addressed data packets to unicast addressed data packets and transmitting the converted data packets. The method and apparatus for the delivery of multicast addressed data packets include receiving a request for one of a plurality of available programs via a first communications interface, maintaining state information, performing address conversion between a multicast address of a source of the one of the plurality of available programs and a unicast address of a requester of the one of the plurality of available programs, transmitting the request for one of the plurality of available programs via a second communications interface, receiving multicast addressed data packets of the requested program via the second communications interface, converting the multicast addressed data packets to unicast addressed data packets and transmitting the unicast addressed data packets of the requested program via the first communications interface.

That is, the problem to be solved is how to design a method and apparatus to reliably transmit multicast data over a wireless network, e.g., a wireless local area network (WLAN).

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

Figure 1:
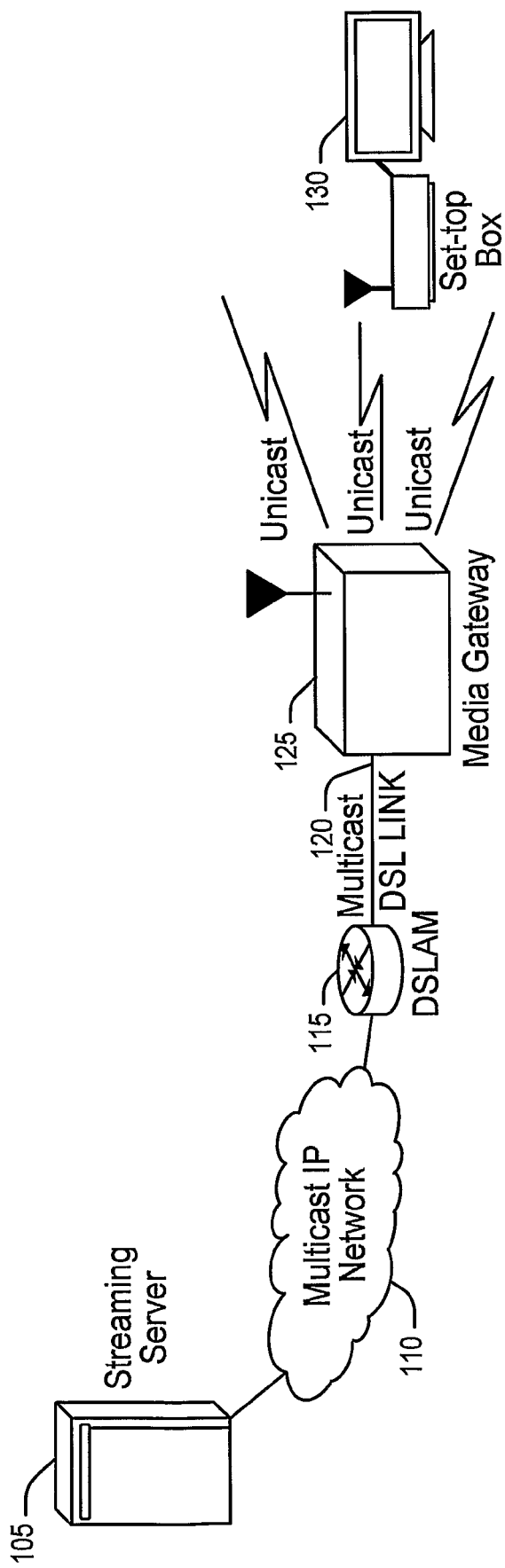
FIG. 1 is a schematic diagram of a wireless network in accordance with the present invention.

Referring to FIG. 1, a network system in accordance with the present invention is shown. A streaming server 105 multicasts one or more programs over an IP multicast network 110 to the Digital Subscriber Line Access Multiplexers (DSLAMs) 115 at a phone company's central location. A program contains a set of one or more streams presented to the receiver as a complete media feed. It is transported with one or more IP multicast groups. If one or more receivers at a customer home join the multicast group for this program, the multicast data packets belonging to a program are then sent through the DSLAM to the media gateway 125 at the customer home over the DSL link 120. When receiving the multicast data packets of the requested program, the media gateway performs multicast-to-unicast conversion and sends the unicast data packets to the receiver 130 in order to take advantage of the transmission reliability for unicast data provided by a WLAN.

Figure 2:
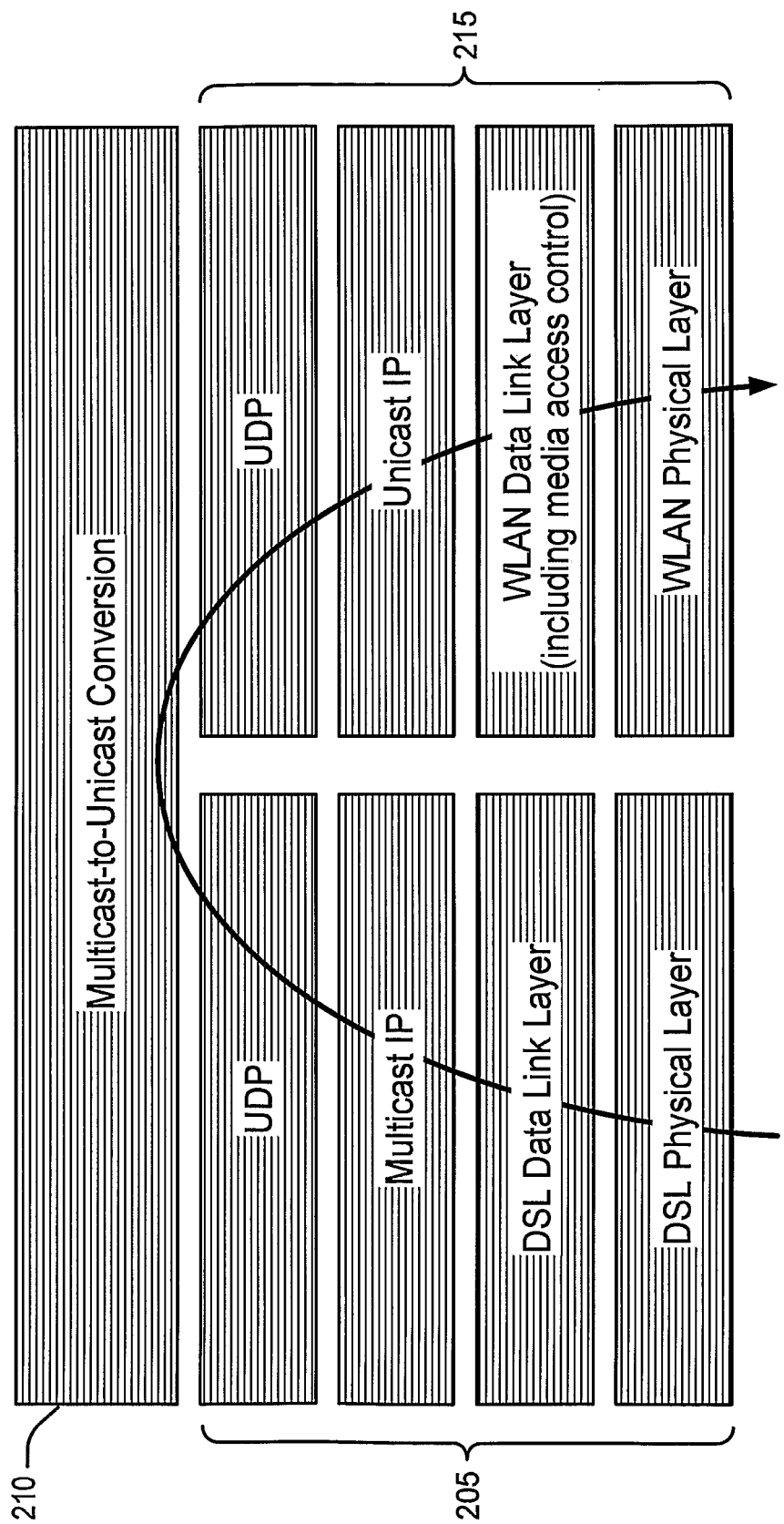
FIG. 2 is a block diagram of the multicast-to-unicast conversion and its relationship to an internet protocol stack.

FIG. 2 shows the multicast-to-unicast packet conversion 210 in the media gateway and its relationship to the standard IP networking environment. The media gateway has two interfaces 205, 215 with two IP addresses, one connecting the DSLAM with DSL modem (external interface) 205, and the other connecting receivers with the WLAN interface (an interface internal to the home) 215. When the media gateway communicates through the external interface, it uses its external IP address. When the media gateway communicates through the internal WLAN interface, the media gateway uses its internal private IP address. The media gateway receives the multicast data packets via its external interface. The media gateway converts the destination multicast network address of the packets to the unicast network address of the receiver that wants to receive this program. The media gateway also converts the source network address in the multicast packets to its own private network address. The network address includes the IP address and the corresponding transport layer port, e.g. the user datagram protocol (UDP) port if the user datagram protocol is used as the transport protocol. The media gateway sends the converted unicast IP packets to the requesting receiver over its IEEE 802.11 wireless LAN interface. Since the destination address is unicast address, the IEEE 802.11 link layer will perform retransmission of the packet in case of packet loss. In addition, the IEEE 802.11 physical layer will adapt the modulation scheme and channel coding rate to optimize the transmission based on the receiver's channel condition. Therefore, the data packets can be more reliably transmitted. Note that neither retransmission nor link adaptation would be performed by the IEEE 802.11 WLAN if there is no multicast-to-unicast conversion, i.e. if the destination address of packets is multicast. If multiple receivers subscribe to the same program, the media gateway converts the multicast packets to multiple unicast packets, for each receiver. It is expected that it is not common that many receivers simultaneously subscribe to the same multicast program within a home.

The present invention is a method and apparatus for reliable delivery of multicast data to one or more receivers over a wireless local area network employing an application layer multicast-to-unicast conversion. The present invention is independent of the type of data that is being transmitted, and can be used for the transmission of any type of multicast data, and is not limited to video/audio/TV programs. Video/audio/ TV programs are exemplary only and the present invention is described in terms of a multicast IP TV program as an example of such data.

Figure 3A:
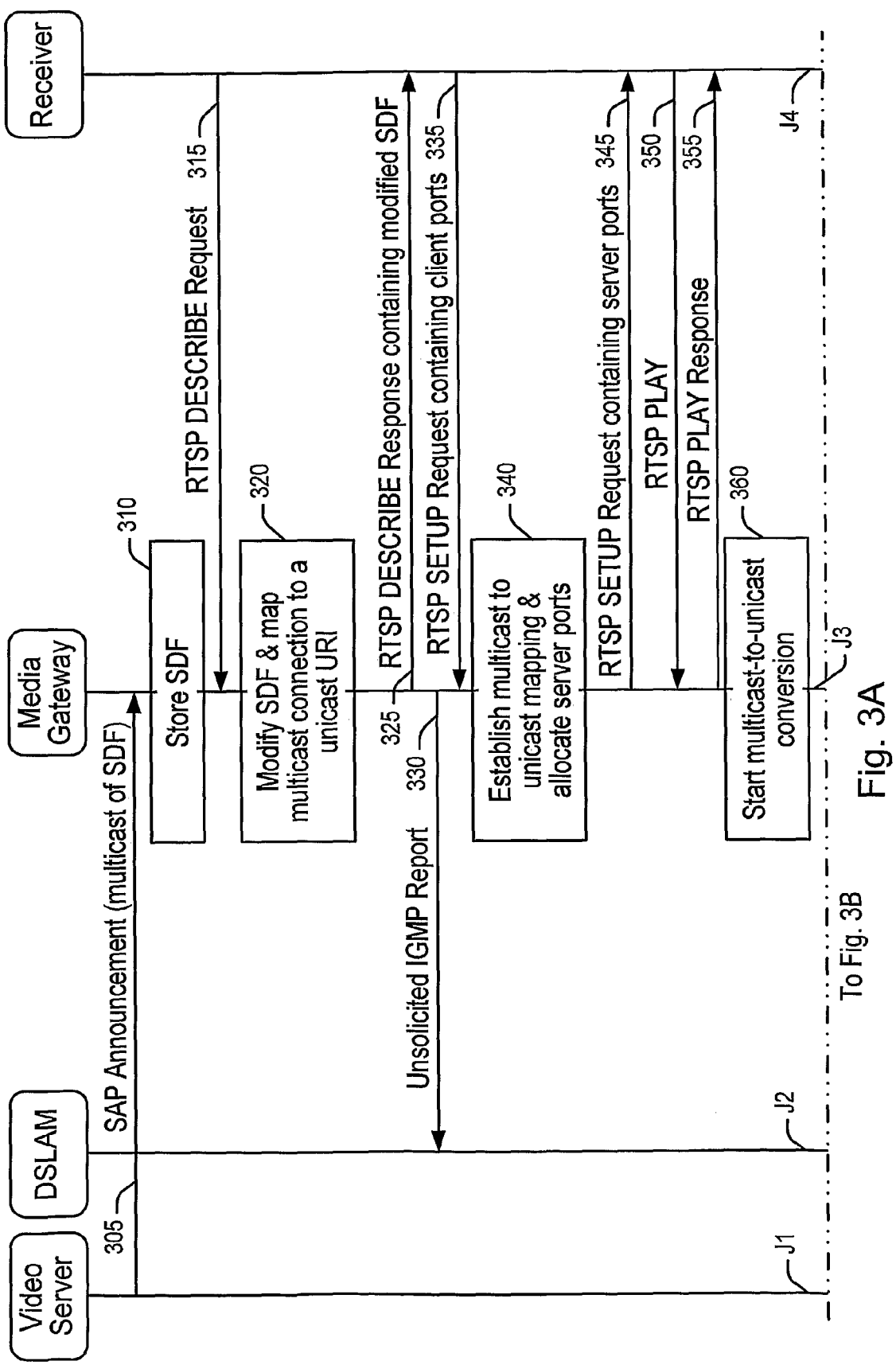
FIG. 3 is a ladder diagram of the method for establishing a session in accordance with the present invention.
Figure 3B:
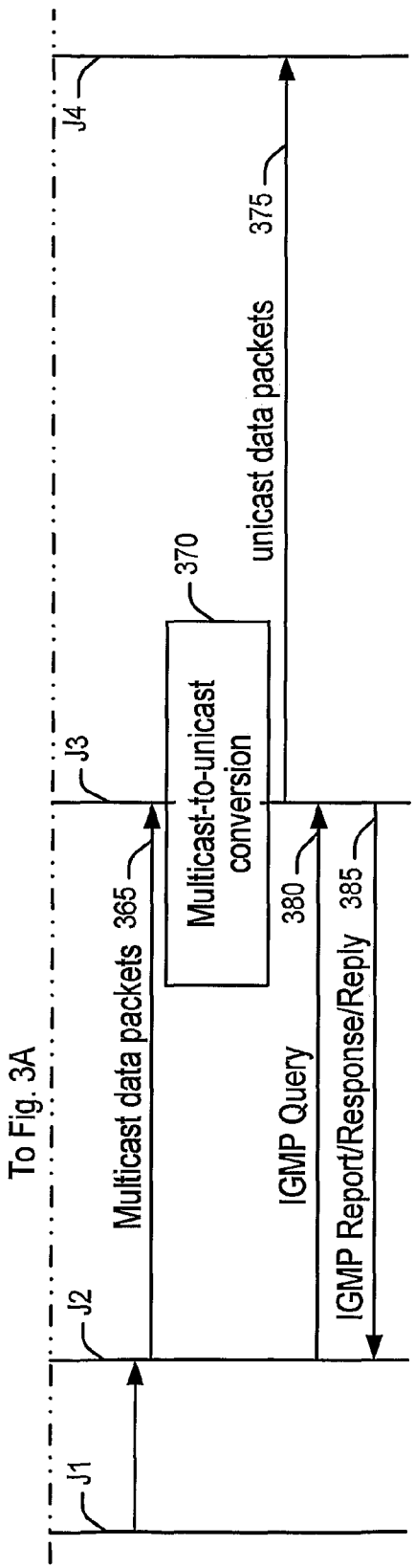

Referring to FIG. 3, the method to establish a session to deliver a program to a receiver is described. The multicast program/session can be described by a session description file/message/directory (SDF) that conforms to the standard form/format, for example, as specified in session description protocol (SDP). The session description files for multicast programs are distributed to the media gateway by the video server using a protocol via the DSLAM. Different protocols can be used for distributing the session description file/message/directory to the media gateway, including but not limited to a standard IETF Session Announcement Protocol (SAP) 305. A session description file/message/directory contains information about one or more media streams within a program, such as the set of encodings, network addresses and information about the content. Once the session description file/message/directory is received by the media gateway, it is stored by the media gateway 310. The program session description may take several different forms, including but not limited to the standard IETF session description format specified in session description protocol (SDP). For the TV programs, a session description file/message/directory describes one or multiple TV channels. Multiple programs may be simultaneously multicast over the DSL network. Each program is multicast to one or more IP multicast groups. However, a program is not delivered to the media gateway by the DSLAM until the program is requested by a receiver and the media gateway joins the corresponding multicast group. The requesting receiver does not have any knowledge of multicast. The requesting receiver communicates with the media gateway to obtain the program information and establish the session using a protocol. Different protocols can be used between the receiver and media gateway to establish the session. An example protocol is the standard IETF Real-Time Streaming Protocol (RTSP). If the RTSP is used, the receiver acts as a RTSP client and the media gateway acts as a RTSP server. The media gateway communicates with the receivers through its WLAN interface with its private IP address. To establish a session, the receiver sends a RTSP DESCRIBE request message 315 to obtain the description (information about media streams, encoding, network address etc.) for a program. When the media gateway receives a RTSP DESCRIBE request for a program from a receiver, the media gateway modifies the original session description file of this program by removing the multicast connection information and maps the multicast connection to unicast uniform resource identifiers (URI) 320. The URI is used by the receiver to identify and set up the session. The media gateway then sends the modified session description with the URI to the receiver in the RTSP DESCRIBE Response 325. If this is the first receiver request for this multicast program, the media gateway sends an unsolicited Internet Group Management Protocol (IGMP) Report 330 through its external interface. The source IP address in the unsolicited IGMP Report is the external address of the media gateway. This IGMP Report results in the media gateway joining the multicast group to receive the data for the program. After the DSLAM receives the IGMP reports, the DSLAM will send the multicast data packets for this program to the media gateway. The receiver sends a RTSP SETUP request 335 to the media gateway that includes the URI for the program and the client UDP ports on which to receive the packets. When the media gateway receives a RTSP SETUP request 335 from a receiver, the media gateway establishes the internal state for multicast-to-unicast conversion and allocates the server data transport ports for unicasting data to the receiver(s) (e.g. through RTP/RTSP protocol and/or UDP protocol) 340. The media gateway sends the server port information to the receiver in an RTSP SETUP response 345.

The receiver then sends a RTSP PLAY request 350 to the media gateway. Once it receives the RTSP PLAY request 350 from the receiver, the media gateway responds to the requesting receiver with an RTSP PLAY Response 355. The media gateway then starts converting the multicast packets received from the external interface to unicast packets 360, changing the destination network address in the packets to the receiver address/port and the source network address to its own address/port. The media gateway receives multicast data packets 365 containing TV program data, for example. The media gateway then performs the multicast-to-unicast conversion at the application layer 370. The unicast packets are sent to the receiver 375 through the WLAN interface. The media gateway also receives an IGMP Query from the DSLAM 380. The media gateway responds with an IGMP Report/Response/Replymessage 385 in order to maintain itself in the corresponding multicast group if it has a receiver for this multicast program. If multiple receivers subscribe to the same multicast program, the media gateway converts a multicast packet to multiple unicast packets, one for each receiver.

Figure 4:
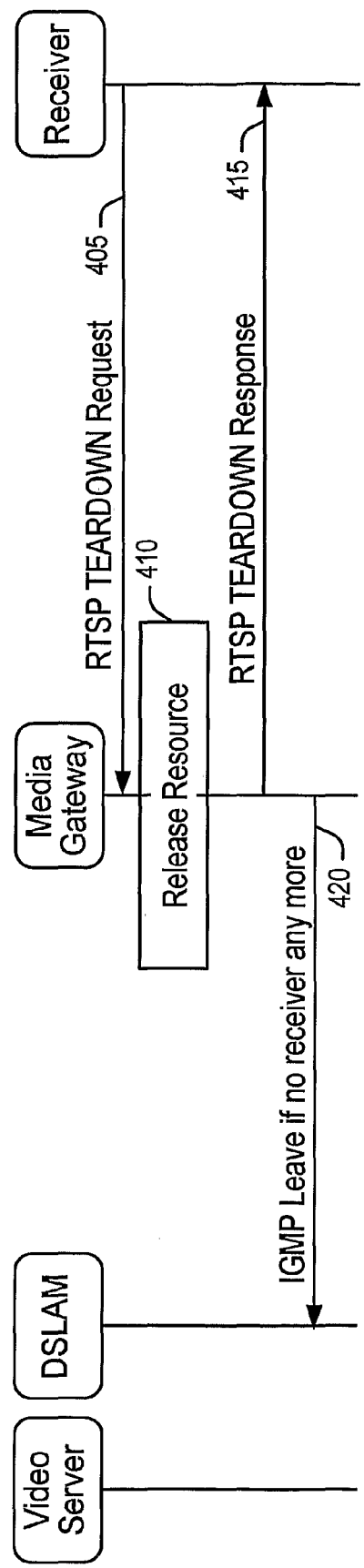
FIG. 4 is a ladder diagram of the method for dis-establishing a session in accordance with the present invention.

Referring now to FIG. 4, the method to tear down a session to deliver a program to a requesting receiver is now described. The requesting receiver/client issues a RTSP TEARDOWN request 405 for a program session to the media gateway. After receiving the RTSP TEARDOWN request, the media gateway stops converting and transmitting the data packets of this program session to this receiver. It also frees the resources associated with the program 410. The media gateway then sends an RTSP TEARDOWN Response to the receiver 415. If this is the last receiver subscribed to this program, i.e. no receiver wants to receive this program any more in this customer home, the media gateway sends an IGMP Leave message to the DSLAM 420. The DSLAM will stop sending the multicast packets of this program to the media gateway over the DSL link. When a receiver changes program or TV channel that it wants to receive, the old session is torn down and the new session is set up.

Figure 5:
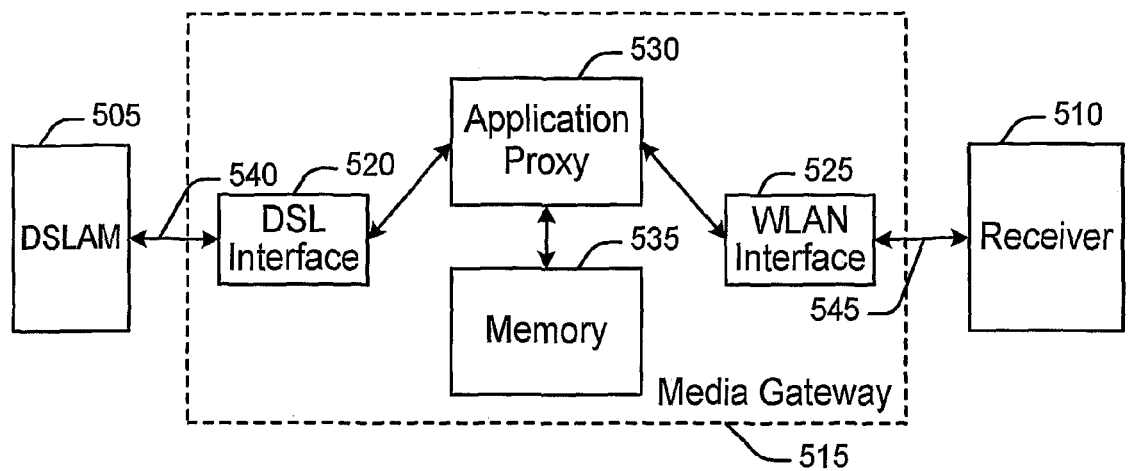
FIG. 5 is a schematic diagram illustrating a media gateway and its connections within the wireless network in accordance with the present invention.

FIG. 5 is a schematic diagram illustrating a media gateway and its connections within the wireless network in accordance with the present invention. The media gateway 125, 515 has two interfaces 520, 525 with two IP addresses, an application proxy module 530 and a memory storage unit 535. The external interface 520 communicates with the DSLAM 505 using the public network address of the media gateway 515 via the DSL link 540. The internal interface 525 communicates with the receivers 510 using the private network address via the wireless LAN interface 545. The application proxy module 530 controls and performs the multicast-to-unicast conversion. The application proxy module 530 receives the multicast packets from the external network communication interface 520, converts the received multicast packets to packets with unicast network addresses and sends the converted unicast packets out through the internal network communication interface 525. The memory unit 535 stores the control information including the multicast-to-unicast network address mapping information and the data packets for processing.

Figure 6:
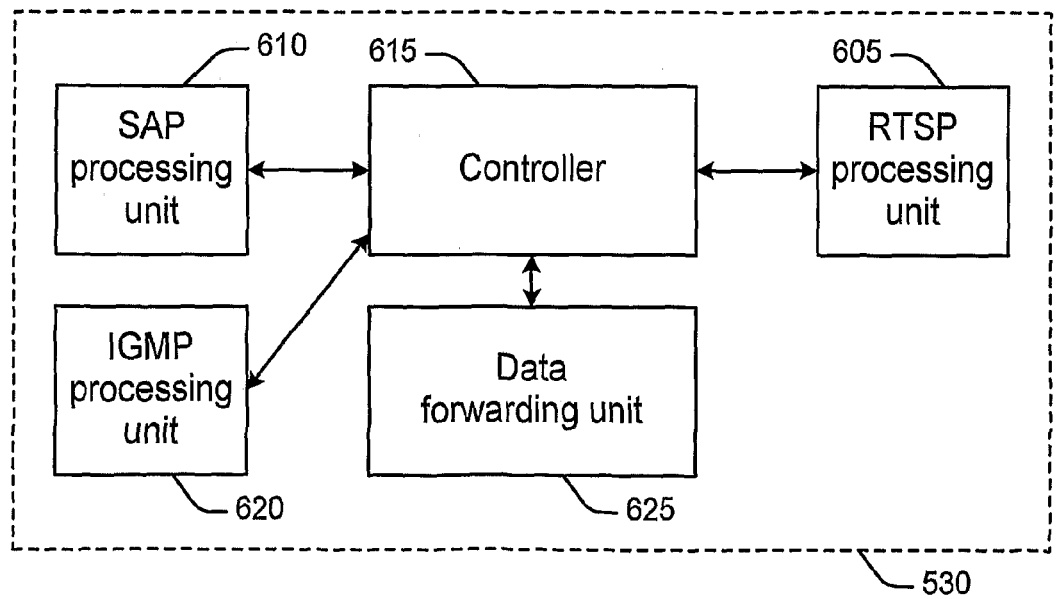
FIG. 6 is a schematic diagram illustrating the components of the application proxy of FIG. 5.

As shown in FIG. 6, the application proxy module includes a RTSP processing unit 605 to receive/process/send the RTSP messages communicated between the media gateway and the receiver and to modify the session description file/message/directory before sending it to the receiver. A SAP processing unit 610 processes the multicast session description files/messages/directories received from the streaming server via the DSLAM. A controller 615 performs the session control functions, including establishing/tearing down the session and adding/deleting the entry in the multicast and unicast address mapping table. The multicast-to-unicast address mapping table includes the mapping information between the multicast network address and the one or more corresponding unicast network address that are stored in the memory. An IGMP processing unit 620 receives/processes/sends the IGMP messages between the media gateway and the DSLAM to join/maintain/leave the multicast group corresponding to a program source. A data forwarding unit 625 converts the data packets with the multicast address to packets with unicast addresses based on the mapping information in the multicast and unicast address mapping table and forwards the converted data packets to the receiver(s) through the WLAN interface.

Figure 7:
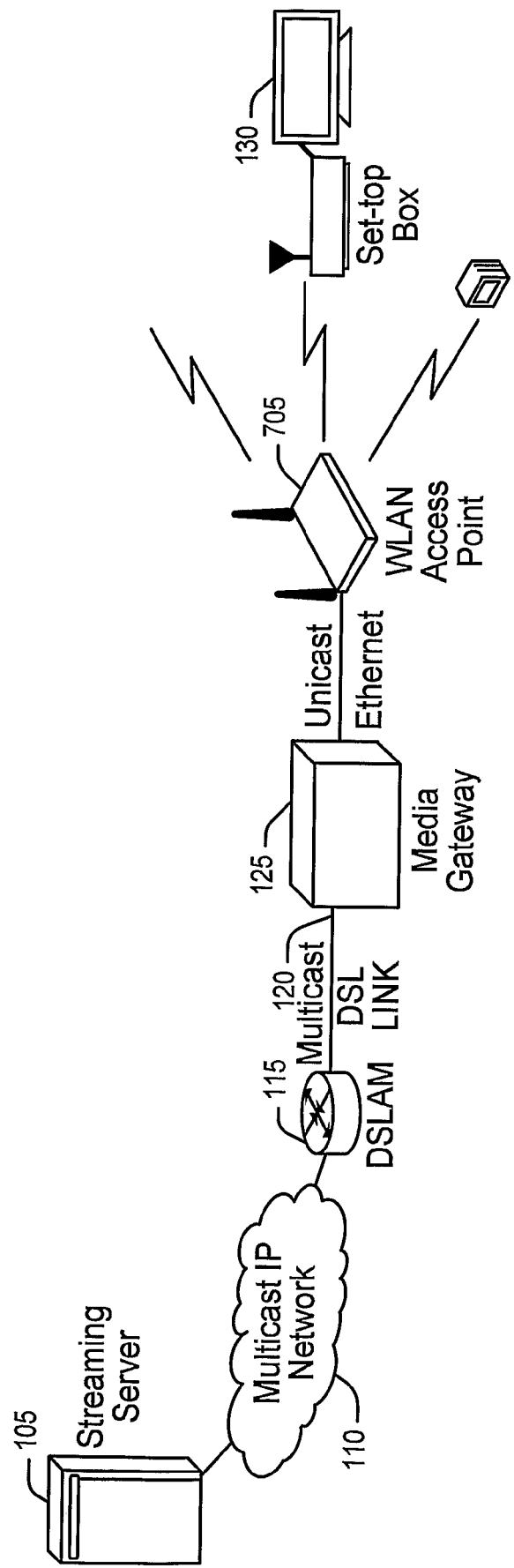
FIG. 7 is a schematic diagram illustrating an alternative embodiment of the media gateway of the present invention.

In an alternative embodiment, the media gateway does not have a built-in wireless LAN interface. It has a wired Ethernet interface. As shown in FIG. 7, the media gateway can connect to a WLAN access point 705 through the Ethernet interface. The media gateway communicates with the receiver via the WLAN access point 705 in this configuration. The session establishment/teardown process and multicast-to-unicast conversion is performed by the media gateway. In yet another alternative embodiment (not shown), a media gateway has multiple built-in wireless LAN interfaces and multiple Ethernet interfaces, as well as other communication interfaces.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for reliable delivery of multicast data by a media gateway employing application layer multicast to unicast conversion, said method comprising:

establishing a session with a receiver;

mapping a multicast connection to a unicast resource identifier;

transmitting to the receiver, information regarding available programs from a server, said available programs comprising a plurality of multicast addressed data packets, wherein said information has been modified by removing multicast connection information from at least one of said available programs;

receiving a request from said receiver to receive one of said available programs, said request including a receiver port address;

joining, by said media gateway, a multicast group in order to request said one of said available programs from said server as a proxy for said receiver, said receiver having no knowledge of multicast;

allocating server ports;

receiving multicast addressed data packets from an external network;

converting said multicast addressed data packets to unicast addressed data packets, said conversion being performed above a transport layer of a communications protocol; and transmitting said converted data packets to said receiver port address.

2. The method according to claim 1, further comprising:
transmitting a response to said received request to said receiver.

3. The method according to claim 1, further comprising:
receiving, from an external network, an announcement containing information regarding said available programs, said available programs comprising a plurality of said multicast addressed data packets;
storing said information;
modifying said information; and
transmitting a response to said request to receive one of said available programs, said response including a server port address.

4. The method according to claim 3, wherein said modifying step further comprises removing multicast connection information from said one of said available programs.

5. The method according to claim 3, further comprising:
receiving a request to cease receiving said one of said available programs;
releasing resources associated with receiving said one of said available program;
responding to said request to cease receiving said one of said available programs; and
transmitting an internet group management protocol message if no other requests for said one of said available programs is outstanding.

6. The method according to claim 1, further comprising:
transmitting, via an external interface, an unsolicited internet group management protocol report;
receiving, via said external interface, an internet group management protocol query; and
transmitting, via said external interface, an internet group management protocol query response.

7. A media gateway for reliable delivery of multicast data employing application layer multicast to unicast conversion, comprising:
means for establishing a session with a receiver;
means for mapping a multicast connection to a unicast resource identifier;
means for transmitting to the receiver, information regarding available programs from a server, said available programs comprising a plurality of multicast addressed data packets, wherein said information has been modified by removing multicast connection information from at least one of said available programs;
means for receiving a request, from a receiver, to receive one of said available programs, said request including a receiver port address;
means for joining, by said media gateway, a multicast group in order to request said one of said available programs from said server as a proxy for said receiver, said receiver having no knowledge of multicast;
means for allocating server ports;
means for requesting said one of said available programs from said server as a proxy for said receiver, said receiver having no knowledge of multicast;
means for receiving said multicast addressed data packets from an external network;
means for converting said multicast addressed data packets to unicast data packets, said conversion being performed above a transport layer of a communications protocol; and
means for transmitting said converted data packets to said receiver port address.

8. The apparatus media gateway according to claim 7, further comprising:
means for transmitting a response to said received request to said receiver.

9. The media gateway according to claim 7, further comprising:
means for receiving, from the external network, an announcement containing information regarding said available programs, said available programs comprising a plurality of said multicast addressed data packets;
means for storing said information;
means for modifying said information; and
means for transmitting a response to said request to receive one of said available programs, said response including a server port address.

10. The media gateway according to claim 9, wherein a communications protocol is used between the apparatus, which is a media gateway, and said receiver to establish a multicast-to-unicast mapping and to deliver said converted data packets to said receiver, further wherein said communications protocol being a real-time streaming protocol.

11. The media gateway according to claim 9, wherein said means for modifying further comprises means for removing multicast connection information from said one of said available programs.

12. The media gateway according to claim 11, further comprising:
means for receiving a request to cease receiving said one of said available programs;
means for releasing resources associated with receiving said one of said available program;
means for responding to said request to cease receiving said one of said available programs; and
means for transmitting an internet group management protocol message if no other requests for said one of said available programs is outstanding.

13. The media gateway according to claim 7, further comprising:
means for transmitting, via an external network, an unsolicited internet group management protocol report;
means for receiving, via said external network, an internet group management protocol query; and
means for transmitting, via said external network, an internet group management protocol query response.

* * * * *